(12) United States Patent
Wilde et al.

(10) Patent No.: US 11,869,494 B2
(45) Date of Patent: Jan. 9, 2024

(54) VOWEL BASED GENERATION OF PHONETICALLY DISTINGUISHABLE WORDS

(71) Applicant: International Business Machines Corporation, Armonk, NY (US)

(72) Inventors: Lorin F. Wilde, Armonk, NY (US); Aditya Vempaty, Yorktown Heights, NY (US); Tamer E. Abuelsaad, Armonk, NY (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 16/244,905

(22) Filed: Jan. 10, 2019

(65) Prior Publication Data

US 2020/0227035 A1 Jul. 16, 2020

(51) Int. Cl.
*G10L 15/22* (2006.01)
*G10L 15/18* (2013.01)
*G10L 15/02* (2006.01)

(52) U.S. Cl.
CPC .............. *G10L 15/22* (2013.01); *G10L 15/02* (2013.01); *G10L 15/1822* (2013.01); *G10L 2015/025* (2013.01)

(58) Field of Classification Search
CPC ..... G10L 15/22; G10L 15/1822; G10L 15/02; G10L 2015/025; G10L 15/01; G10L 2021/065; G10L 21/06; G10L 25/48; G10L 13/00; G10L 15/16; G10L 19/0018; G10L 21/02; G10L 21/0272; G10L 25/18; G10L 13/02; G10L 15/26; G10L 13/06; G10L 13/08; G10L 15/00; G10L 15/187; G10L 2013/105; G10L 2015/086; G10L 15/06; G10L 17/26; G10L 2015/227; G10L 2015/228; G10L 25/54; G10L 25/90; G06F 40/232; G06F 40/205; G06F 3/011; G06F 3/016; G06F 3/167; G06F 3/018; G06F 3/04883; G06F 40/268; G06F 40/166; G06F 40/274; G06F 3/0237; G06F 3/0488; G06F 3/04886; G06F 40/242; G06F 16/433; G06F 16/434; G06F 16/4393; G06F 16/48;
(Continued)

(56) References Cited

U.S. PATENT DOCUMENTS 4,741,036 A * 4/1988 Bahl ..................... G10L 15/144
704/256
5,799,276 A * 8/1998 Komissarchik ......... G10L 15/04
704/207
(Continued)

OTHER PUBLICATIONS

H Kim, M Hasegawa-Johnson, (Vowel contrast and speech intelligibility in dysarthria), Folia Phoniatr Logop 2011;63:187-194; https://doi.org/10.1159/000318881.*
(Continued)

*Primary Examiner* — Abdelali Serrou
(74) *Attorney, Agent, or Firm* — Michael A. Petrocelli; McGinn I.P. Law Group, PLLC

(57) ABSTRACT

A system, apparatus and a method for determining distinguishable data, includes processing input data into a plurality of elements, calculating distinguishability of the plurality of elements using phonetic vowels, and determining distinguishable elements from among the plurality of elements, according to the distinguishability calculation.

14 Claims, 10 Drawing Sheets

(58) Field of Classification Search
CPC ........ G06F 16/61; G06F 16/685; G06F 3/038;
G06F 16/3338; G06F 3/014; G06F 3/017;
G06F 3/0233; G06F 3/0235; G06F
3/03545; G06F 3/04842; G06F 16/3335;
G06F 1/1615; G06F 1/1626; G06F 1/163;
G06F 1/1632; G06F 1/1641; G06F
1/1652; G06F 1/1662; G06F 1/1684;
G06F 1/1686; G06F 1/169; G06F 1/1696;
G06F 21/46; G06F 2203/0381; G06F
3/0213; G06F 3/0219; G06F 3/0221;
G06F 3/0234; G06F 3/042; G06F 3/0481;
G06F 40/126; G06F 40/253; G06F
40/284; G06F 40/30; G06F 40/53; G06F
40/56; G06F 16/3343; G06F 16/3344;
G06F 16/345; G06F 16/353; G06F 16/78;
G06F 16/7837; G06F 16/7844; G06F
16/9535; G06F 3/0202; G06F 3/023;
G06F 3/0236; G06F 3/0238; G06F
3/0346; G06F 3/03543; G06F 3/03547;
G06F 3/0426; G06F 3/0489; G06F
40/103
See application file for complete search history.

(56) References Cited

U.S. PATENT DOCUMENTS

| | | | | |
|---|---|---|---|---|
| 5,799,278 | A * | 8/1998 | Cobbett | G10L 15/142 704/232 |
| 5,893,133 | A * | 4/1999 | Chen | G06F 3/018 715/264 |
| 6,038,531 | A * | 3/2000 | Miyazawa | G10L 15/16 704/232 |
| 6,108,627 | A * | 8/2000 | Sabourin | G10L 15/187 704/10 |
| 6,317,712 | B1 * | 11/2001 | Kao | G10L 15/063 704/256.3 |
| 6,513,005 | B1 * | 1/2003 | Qin | G10L 15/22 704/E15.04 |
| 6,678,658 | B1 * | 1/2004 | Hogden | G10L 15/063 704/240 |
| 6,871,177 | B1 * | 3/2005 | Hovell | G10L 15/26 704/231 |
| 7,818,165 | B2 * | 10/2010 | Carlgren | G06F 40/289 704/8 |
| 8,678,828 | B2 | 3/2014 | Gray | |
| 8,734,158 | B2 * | 5/2014 | Cornell | G09B 23/02 434/188 |
| 8,849,666 | B2 * | 9/2014 | Jaiswal | G10L 13/033 704/254 |
| 8,886,539 | B2 * | 11/2014 | Chen | G10L 13/0335 704/268 |
| 9,262,941 | B2 | 2/2016 | Chen et al. | |
| 9,489,864 | B2 | 11/2016 | Evanini | |
| 10,002,543 | B2 * | 6/2018 | Telep | G10L 25/48 |
| 10,034,099 | B2 * | 7/2018 | Acharya | G10L 21/03 |
| 10,073,832 | B2 | 9/2018 | Zelenkov | |
| 10,672,390 | B2 * | 6/2020 | Siddiq | G10L 15/1815 |
| 10,978,045 | B2 * | 4/2021 | Lee | G10L 15/005 |
| 2003/0049588 | A1 * | 3/2003 | Lawrence | G06F 40/232 434/167 |
| 2006/0063139 | A1 * | 3/2006 | Carver | G09B 17/00 434/178 |
| 2007/0061143 | A1 | 3/2007 | Wilson | |
| 2008/0077396 | A1 * | 3/2008 | Hsu | G06F 40/232 704/10 |
| 2008/0187892 | A1 * | 8/2008 | Lancaster | G09B 17/00 434/178 |
| 2008/0270138 | A1 * | 10/2008 | Knight | G06F 16/433 704/260 |
| 2008/0270344 | A1 * | 10/2008 | Yurick | G06F 16/4393 |
| 2009/0132237 | A1 * | 5/2009 | Gugenheim | G10L 15/187 704/10 |
| 2009/0216535 | A1 * | 8/2009 | Entlis | G10L 15/02 704/254 |
| 2010/0068682 | A1 | 3/2010 | Su et al. | |
| 2010/0217591 | A1 | 8/2010 | Shpigel | |
| 2010/0332230 | A1 * | 12/2010 | Shu | G10L 15/01 704/E15.005 |
| 2012/0016672 | A1 * | 1/2012 | Chen | G10L 25/60 704/236 |
| 2012/0095765 | A1 * | 4/2012 | Bodin | G10L 15/22 704/251 |
| 2012/0095767 | A1 * | 4/2012 | Hirose | G10L 13/033 704/258 |
| 2012/0164611 | A1 * | 6/2012 | O | G09B 19/06 434/167 |
| 2013/0054227 | A1 | 2/2013 | Wang et al. | |
| 2014/0081640 | A1 * | 3/2014 | Farrell | G10L 17/00 704/249 |
| 2014/0195239 | A1 * | 7/2014 | Evanini | G10L 25/60 704/254 |
| 2014/0236602 | A1 | 8/2014 | Graham et al. | |
| 2015/0058006 | A1 * | 2/2015 | Proux | G10L 15/26 704/235 |
| 2015/0066474 | A1 * | 3/2015 | Yi | G06F 40/284 704/8 |
| 2016/0133155 | A1 | 5/2016 | Lee et al. | |
| 2016/0163310 | A1 * | 6/2016 | Lee | G10L 25/30 704/232 |
| 2016/0260033 | A1 * | 9/2016 | Keyngnaert | G06F 17/18 |
| 2016/0358609 | A1 * | 12/2016 | Connell, II | G10L 15/26 |
| 2018/0040321 | A1 * | 2/2018 | Kwon | G10L 15/02 |
| 2018/0040338 | A1 | 2/2018 | Schiro | |
| 2018/0122376 | A1 * | 5/2018 | Kojima | G10L 15/22 |
| 2018/0182399 | A1 * | 6/2018 | Suyama | G10L 15/32 |
| 2020/0027447 | A1 * | 1/2020 | King | G10L 15/187 |

OTHER PUBLICATIONS

Mel, et al. "The NIST Definition of Cloud Computing". Recommendations of the National Institute of Standards and Technology. Nov. 16, 2015.

Saadoon, Majid Mohammed; "Vowel Sound Symbols and Schools of Transcriptions", Communication and Linguistics Studies, vol. 4, No. 1, pp. 1-13, Apr. 8, 2018.

Aylett, Matthew; "Buiding a Statistical Model of The Vowel Space for Phoneticians", ICSLP'98 5th International Conference On, pp. 1-6, Nov. 30-Dec. 4, 1998.

Elvin et al.; "Predicting Vowel Discrimination Accuracy Through Cross-Linguistic Acoustic Analysis", ICPhS'15 18th International Congress On, pp. 1-5, Aug. 10-14, 2015.

Ge, Zhenhao; "Improved Accent Classification Combining Phonetic Vowels With Acoustic Features", Cornell University Library, pp. 1-6, Feb. 24, 2016.

* cited by examiner

VOWEL BASED GENERATION OF PHONETICALLY DISTINGUISHABLE WORDS

BACKGROUND OF THE INVENTION

Field of the Invention

The disclosed invention relates generally to an embodiment of a method and system for supporting generation of distinguishable words, and more particularly, but not by way of limitation, relating to a method, apparatus, and system for vowel-based generation of phonetically distinguishable (or discriminable) words.

Description of the Background Art

In today's world of massive access and use of information, there has been a rise of faster processors and computers to receive and manage all the relevant information. Input of such information is needed and there has been a rise of speech to text systems to improve the efficiency of the data input. However, speech to text systems are not always able to recognize and understand input from users.

In many cases an application can help a speech to text (STT) transcriber by providing phonetically distinguishable options. However, this is something that is not done today in both an efficient and robust manner for small data sets.

Therefore, there is a need to obtain a more efficient system and method to recognize and understand input from users, machines, sensors or other devices.

SUMMARY OF INVENTION

In view of the foregoing and other problems, disadvantages, and drawbacks of the aforementioned background art, an exemplary aspect of the disclosed invention provides a method, apparatus, and system for vowel-based generation of phonetically distinguishable (or discriminable) words.

One aspect of the present invention is to provide a method of generating distinguishable data, including processing input data into a plurality of elements, calculating distinguishability of the plurality of elements using phonetic vowels, and determining distinguishable elements from among the plurality of elements, according to the distinguishability calculation.

Another aspect of the present invention provides system for generating distinguishable data, including a memory storing computer instructions, and a processor configured to execute the computer instructions to process input data into a plurality of elements, calculate distinguishability of the plurality of elements using phonetic vowels, and determine distinguishable elements from among the plurality of elements, according to the distinguishability calculation.

Another example aspect of the disclosed invention is to provide a computer program product comprising a computer readable storage medium having program instructions embodied therewith, the program instructions readable and executable by a computer to cause the computer to perform a method, including processing input data into a plurality of elements, calculating distinguishability of the plurality of elements using phonetic vowels, and determining distinguishable elements from among the plurality of elements, according to the distinguishability calculation.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF PREFERRED EMBODIMENTS

Figure 1:
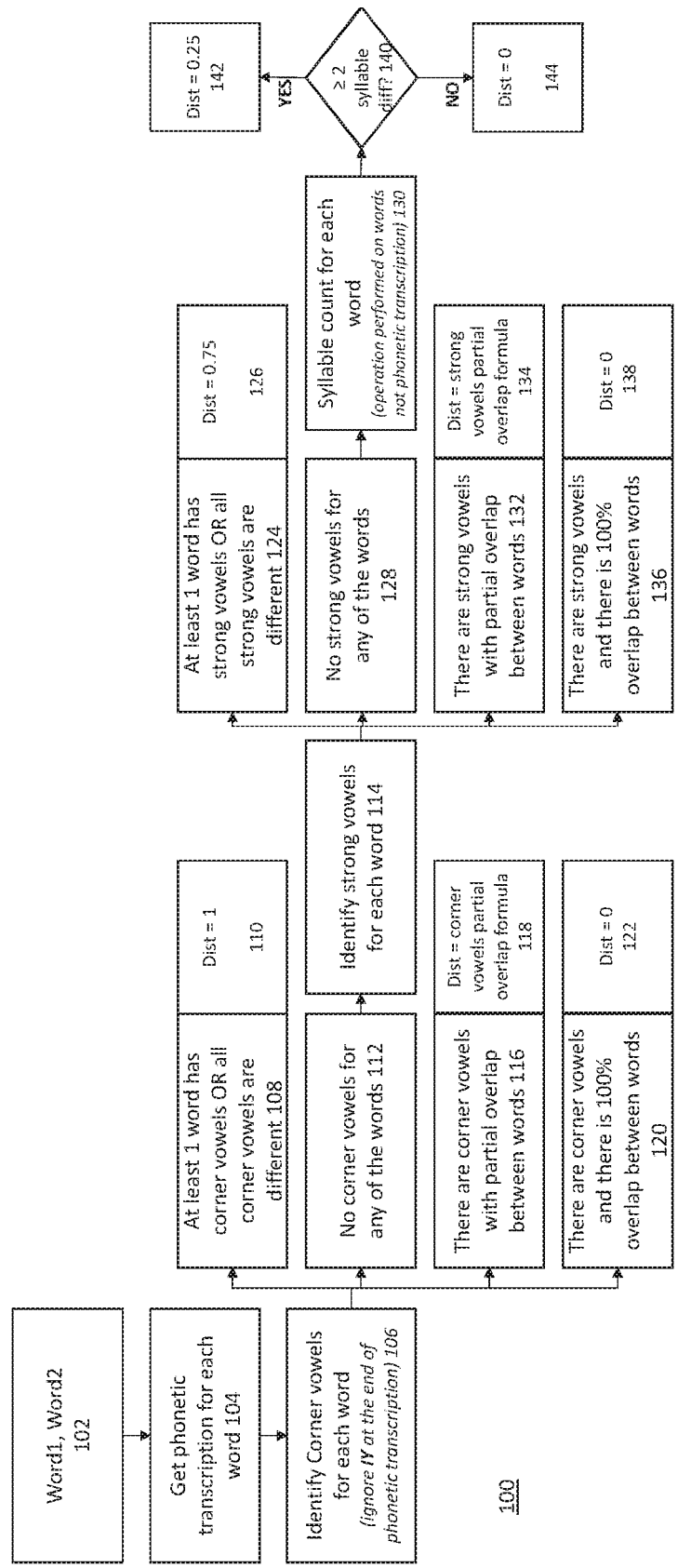
FIG. 1 illustrates a vowel saliency solution according to an example embodiment.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

In the most simplified phonetic contrast, vowels (V) are voiced speech sounds, i.e., generated with source excitation at the vocal folds, and are filtered by a relatively open vocal tract, as contrasted with consonants (C) that are made by significantly constricting the vocal tract.

Therefore, a vowel can be a class of speech sound or speech sound that is produced by comparatively open configuration of the vocal tract from larynx to the lips. Vowels serve as the "syllable nucleus" in the sound system of a language, which means that only one vowel can occur within a syllable unit. The use of vowels in the present invention is not restricted to any particular language or method of communication since it is universally applicable.

The following characteristics allow phonetically distinct vowels to be more easily recognizable than other speech sounds in adverse listening situations: vowels are easier to articulate, longer in duration, and louder in amplitude than many of the consonants in any language. For example, research has shown that vowels can carry most of the acoustic energy in speech, but only some of the linguistic content, while vice a versa for consonants.

Vowels can thereby be more robust than consonants for accurate speech recognition under a variety of situations and for a variety of speakers. When a set of speech input to Automatic Speech Recognizers can be restricted to be phonetically distinguishable for targeted tasks, such as vocabulary learning or command and control for robots, distance metrics can be devised to maximize accuracy.

Therefore, a solution to the problems of speech to text recognition can be as follows. Given a list of vocabulary words that can be used for input to a Speech System, the idea is to improve the chance for the Speech system to understand what a user said. In order to do this, choices presented to the user need to not be confusable to the processing machine (Speech to text transcriber).

Generation of phonetically distinguishable (or discriminable) word sequences one of the features of the present invention, where phonetic distinguishability (or discriminability) is calculated by one of the following methods.

There can be a method of clustering of words based on vowel saliency. There is also a method of phonetic weighted distinguishability, where the weights are provided in a matrix by a machine or a human Subject Matter Expert (SME). Other methods can be used, as these are only examples.

Vowel acoustics are primarily determined by the articulatory position of the tongue. Two dimensions, often diagramed in "Vowel Charts", are described: 1. Tongue height (high-low, also called closed-open) and 2. Tongue advancement (front-back). For example, the High-Front vowel is heard in the words "bee" and "be" (which are both transcribed phonetically as [b i] using the International Phonetic Alphabet or /B IY/ using ARPABET). Also, vowels can be classified according to their relative strength: weak (or lax) vs. strong. In particular, "corner vowels" are strong vowels that are maximally distinguishable in acoustic space due to their extreme tongue position as compared to other vowels.

In American English, vowel identity can be heard in the spoken digits "one through ten": each has a unique vowel sound (except for nine and five). That is one reason early speech recognizers and recognizers under adverse listening conditions were limited to words distinguished by vowels. Weaker, malleable consonant sounds may contain more information, but that information may be confused by automatic speech recognizers. Acoustic confusability could render particular applications ineffective, e.g., a voice calculator that needs to accurately recognize phrases such as "five times nine".

In the following, examples depict methods of how to use vowels to define a distinguishability measure between words. It is to be appreciated that these are non-limiting examples and the values and flows mentioned are to illustrate an approach.

Referring to FIG. 1, a vowel saliency solution is illustrated according to an example embodiment.

For example, a function is described as follows:

$$f(word1, word2) = \text{phonetic distance } \{0 \ldots 1\}.$$

First, the word1 and word2 are inputted at step 102. Then, the system 100 obtains the phonetic transcription for each word in step 104. Then, the system 100 identifies corner vowels for each word 106.

The system 100 includes coarticulation effects, such as avoiding potentially over-counting the occurrence of /IY/ at the end of multisyllabic words, since this sound often loses some of its strength and character (i.e., is reduced and centralized) when de-stressed. For example, a dictionary pronunciation of the word "fizzy" might be noted as /F IH Z IY/. However, in conversational speech, the acoustic realization of the underlying corner vowel /IY/ in the final syllable of a multisyllabic word is likely to be closer to the weak vowel /IH/. In this example, "fizzy" would be more likely transcribed as /F IH Z IH/: i.e., no corner vowel would be counted. This is one example, but other variations and examples can be made.

If, at least one word has corner vowels or all corner vowels are different (108), then the distance is equal to 1 (110). If there are corner vowels with partial overlap between words 116, then the distance=corner vowels partial overlap formula 118. If there are corner vowels and there is 100% overlap between words 120, then the distance is equal to zero (122).

If there are no corner vowels for any of the words ("word 1" and "word 2") 112, then there is an identification of strong vowels for each word 114.

Corner Vowel Partial Overlap formula can be, for example:

$$0.5 \times \left(1 - \frac{overlapCount}{\min(numCornerVowels_{word1}, numCornerVowels_{word2})}\right)$$

Where overlap count=overlapCount, a minimum of the number of corner vowels of word 1 and number of corner vowels of word 2.

Strong Vowel Partial Overlap can be, for example:

$$0.75 \times \left(1 - \frac{overlapCount}{\min(numStrongVowels_{word1}, numStrongVowels_{word2})}\right)$$

Where overlap count=overlapCount, a minimum of the number of strong vowels of word 1 and number of strong vowels of word 2.

Then, if at least one word has strong vowels or all strong vowels are different 124, the distance is equal to 0.75 (step 126). If there are strong vowels with partial overlap between words 132, the distance=strong vowels partial overlap formula 134. If there are strong vowels and there is 100% overlap between words 136, then the distance is 0 (step 138).

If there are no strong vowels for any of the words 128, then the Syllable count for each word (operation performed on words not phonetic transcription) 130 is determined. If there is ≥2 syllable difference (step 140), then the distance=0.25 in step 142, if not, then the distance is zero in step 144.

Phonetically weighted distinguishability is further detailed as follows. For example, there are There are 44 phonemes in English language (24 consonants and 20 vowels). The system 100 can build a 44×44 cost matrix C which represents the "ground distance" between phonemes. These values $\{c_{ij}\}$, between 0 and 1, represent the cost associated with "transforming" phoneme i to phoneme j. In other words, it represents the phonetic confusability between the two phonemes.

For example, the cost between any two corner vowels is 1, as they are the most distinguishable phonemes. Values of the cost matrix can be determined either using a SME that fills in the symmetric cost matrix C or data-driven manner, SMEs provide data such as distance values between phonemes.

Figure 2:
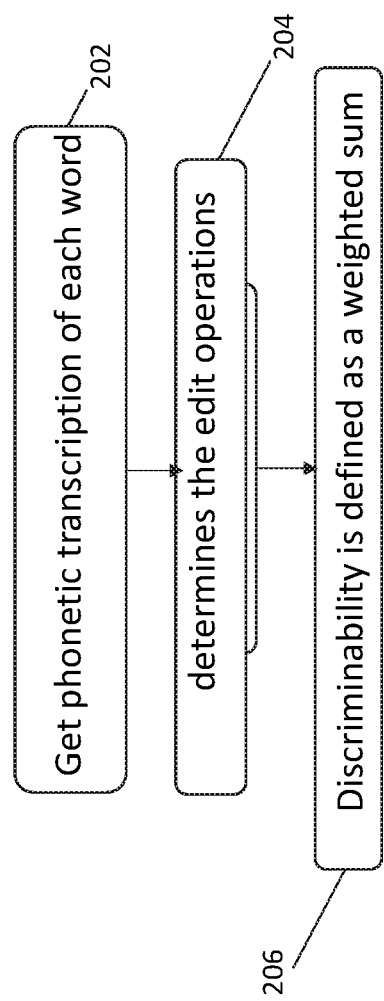
FIG. 2 is an illustration of the calculation of distinguishability in an example embodiment.

FIG. 2 is an illustration of the calculation of distinguishability (or discriminability) in an example embodiment. Given two words, the system 100 calculates the distinguishability by the following steps.

First, the system 100 obtains phonetic transcription of each word (step 202). Then, the system 100 determines the edit operations to convert one word's transcription to the second word's transcription (additions, deletions, substitutions) (step 204).

Distinguishability (or discriminability) is defined as a weighted sum of the edit operations (a la, weighted Levenshtein distance) (206). It is to be appreciated that weighted distance is an example algorithm and other approaches using same input set are also covered.

Figure 3:
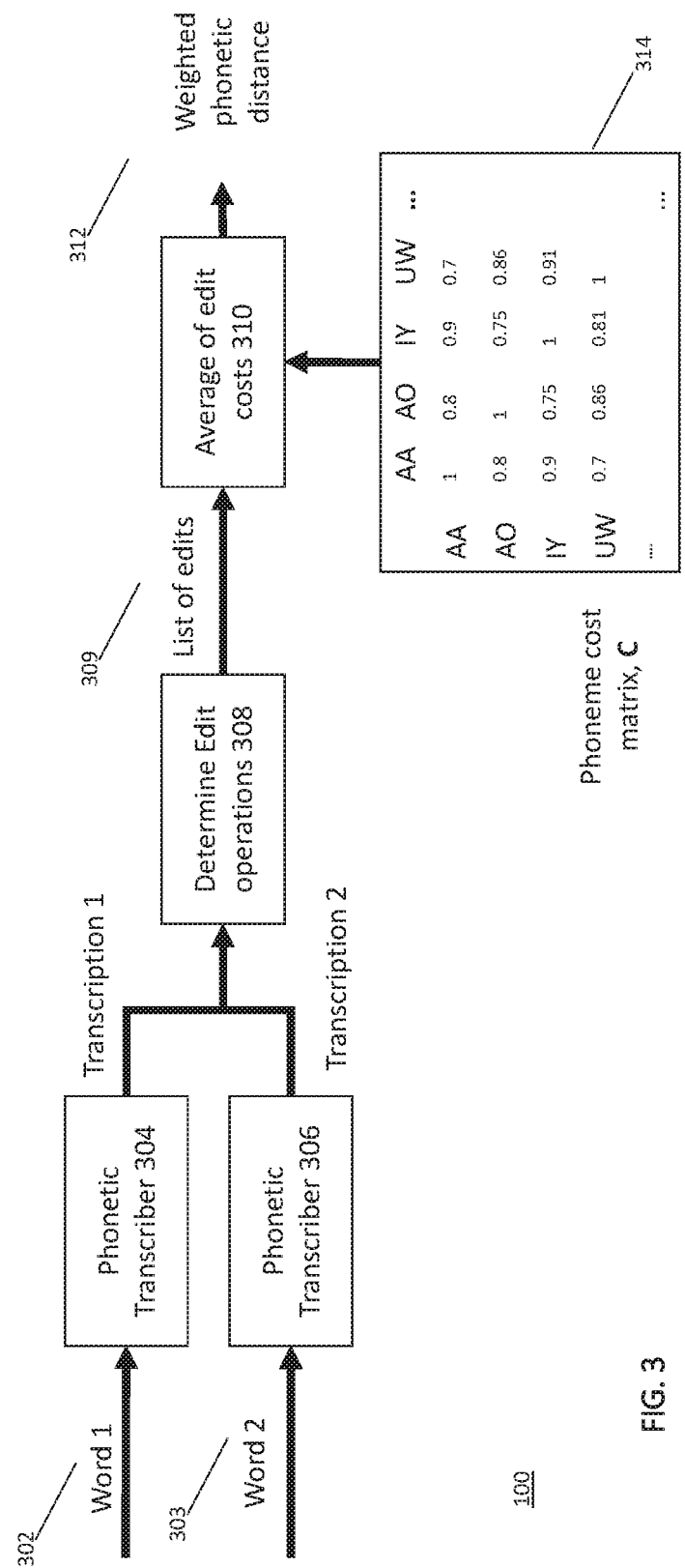
FIG. 3 illustrates an example of phonetic weighted distinguishability of an example embodiment.

FIG. 3 illustrates an example of phonetic weighted distinguishability. It is to be appreciated that the input can be multiple words and the output would contain phonetic distance between word pairs or clusters of words by phonetic distance.

In this example, please let the function be as follows:

$f(word_1, word_2)$=weighted phonetic distance

The $word_1$, $word_2$ are input 301 and 302, respectively, into the system 100. The phonetic transcriber 304 outputs transcription 1 and phonetic transcriber 306 outputs transcription 2. Transcription 1 and transcription 2 are used to determined edit operations in step 308.

The edit operations are the changes needed to convert phonetic transcription 1 into phonetic transcription 2. The weights determined from Phoneme cost matrix, C 314 are used as the cost of converting each phoneme in phonetic transcription 1 to a phoneme in phonetic transcription 2.

A list of edits is generated 309. The list of edits 309 and an input of Phoneme cost matrix, C 314 are used to generate the average of edits costs 310, which then generates the weighted phonetic distance 312. As seen in the Phoneme cost matrix 314, it is shown as an N by N matrix of the phonemes and their distances to one another. The SME can focus on the distances between vowel sounds and nothing else.

Figure 4:
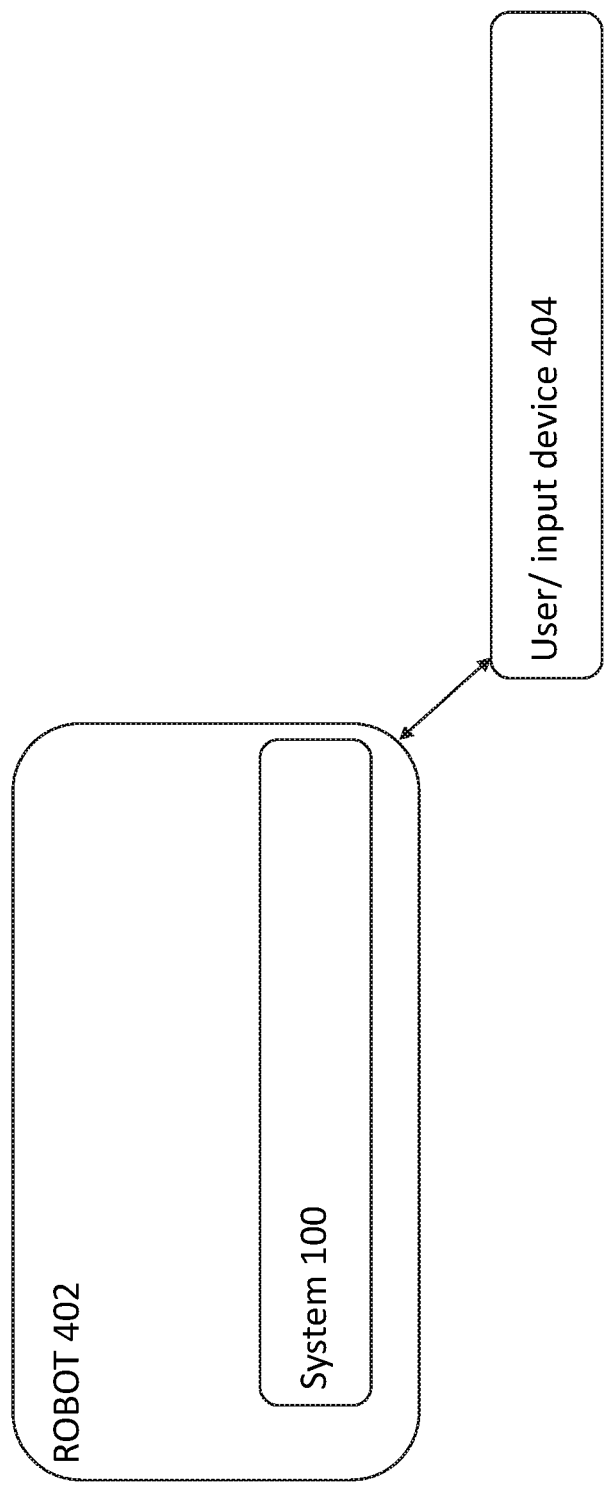
FIG. 4 illustrates a first scenario of an example embodiment.

The following is a scenario 1 example. FIG. 4 illustrates a first scenario of an example embodiment. For example, a team is developing a robot 402 that is to be commanded by voice. To do this, the robot 402 requires a Speech to Text System 100 to receive the voice commands and convert them into actions from a user or input device 404. While the team is developing the command language for their robot 402, they make use of the present system 100 to ensure that the set of vocabulary used for the commands are phonetically distinguishable, for example. The system 100 can avoid including potentially confusable commands, e.g., "Walk" and "Halt". The system 100 uses phonetically distinguishable words, e.g., "Go" and "Halt", or, more notably, "Go" and "Stop" which, despite similar vowel spelling, have distant vowel pronunciations. The system 100 can be cloud based, outside of the robot 402 or another configuration.

Figure 5:
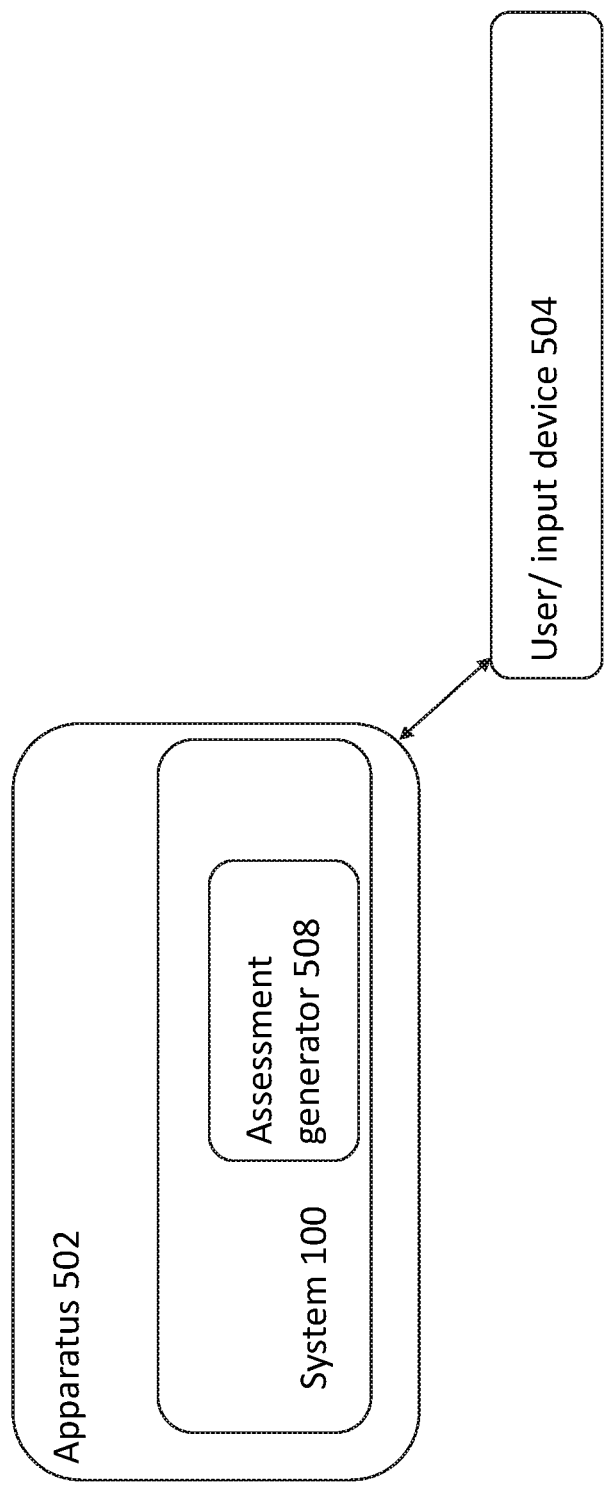
FIG. 5 illustrates a second scenario of an example embodiment.

FIG. 5 illustrates a second scenario of an example embodiment. In the scenario 2 example, a tutor is generating assessments for a system 100 that has multiple input modalities, one of which is voice. The assessments can be made with an assessment generator 508 which can be part of the system 100 in an apparatus 502. Assuming the assessment are of a type that presents the user 504 with choices, such as, Multiple Choice or Match the following, the system 100 will need to present the choices to the learner and listen for their answer.

The assessment generator 508 consults the techniques of the system 100 to ensure that the choices being presented are phonetically distinguishable (at least the correct vs wrong answers).

Further, based on the present invention, the assessment generator 508 could mark generated assessments as to whether they are appropriate for voice input or not.

Therefore, the present invention as seen example systems 100, phonetically distinguishable words using phonetic vowel analysis are generated. The words are a representation of options that are presented to an application user where speech is an input modality. The techniques of the present invention are application for any language or any mode of communication, since the methods shown are universally applicable. Other modalities of input can also be used in addition to speech.

Therefore, the present invention can include a method for generating phonetically distinguishable words utilizing words' phonetic vowels, where distinguishability is calculated by one or more of the following methods of clustering based on vowel saliency, phoneme cost matrix, and other methods of distinguishability.

The generated distinguishable words can be used for assessments (or the like), presented by a tutoring system, where a learner provides their answer selection via voice input. The generated distinguishable words can be used to created machine control grammar, such as in command and control (human robot interaction).

The system 100 of the present invention can be configured in various forms. The following shows a plurality of examples in which system 100 can be configured as. In addition to the examples of the system 100 shown, there can also be included specialized integrated circuit chips configured to process or co-process the techniques shown above.

Figure 6:
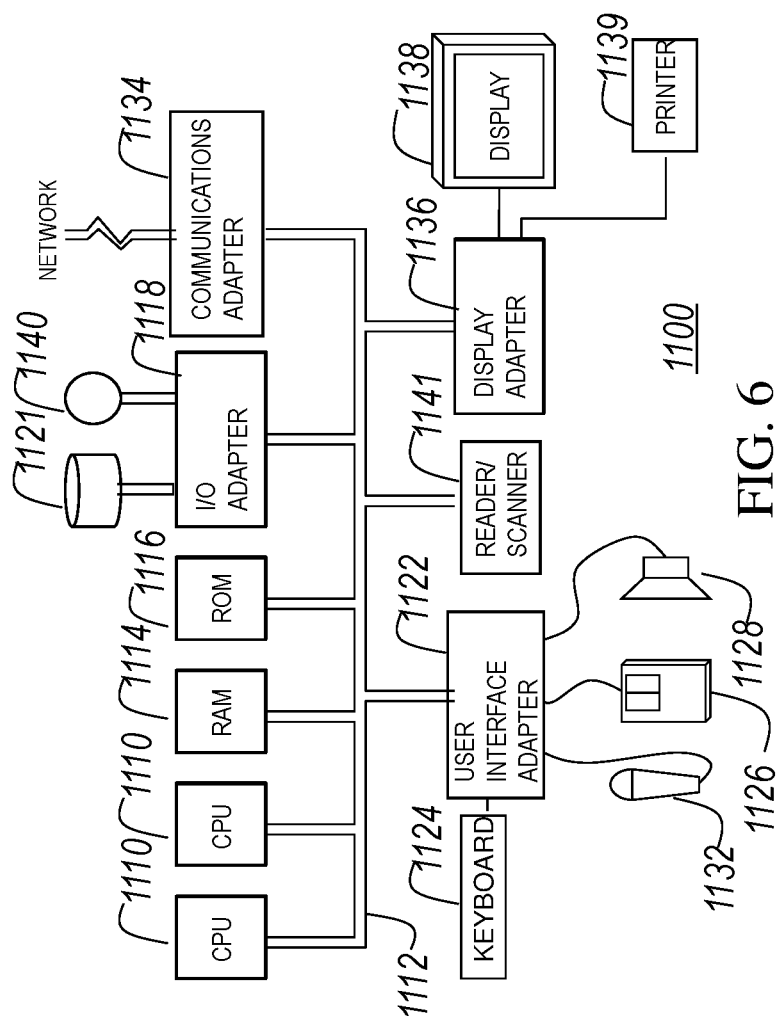
FIG. 6 illustrates an exemplary hardware/information handling system for incorporating the example embodiment of the invention therein.

FIG. 6 illustrates another hardware configuration of the system 100, where there is an information handling/computer system 1100 in accordance with the present invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RANI contained within the CPU 1110, as represented by the fast-access storage for example.

Figure 7:
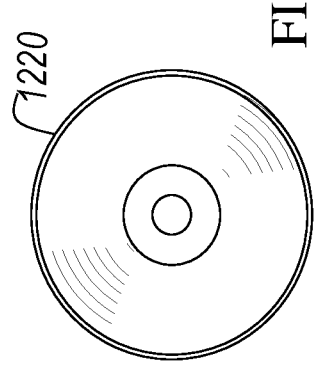
FIG. 7 illustrates a signal-bearing storage medium for storing machine-readable instructions of a program that implements the method according to the example embodiment of the invention.
Figure 7:
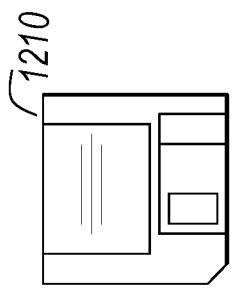

Alternatively, the instructions may be contained in another signal-bearing storage media 1200, such as a magnetic data storage diskette 1210 or optical storage diskette 1220 (FIG. 7), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
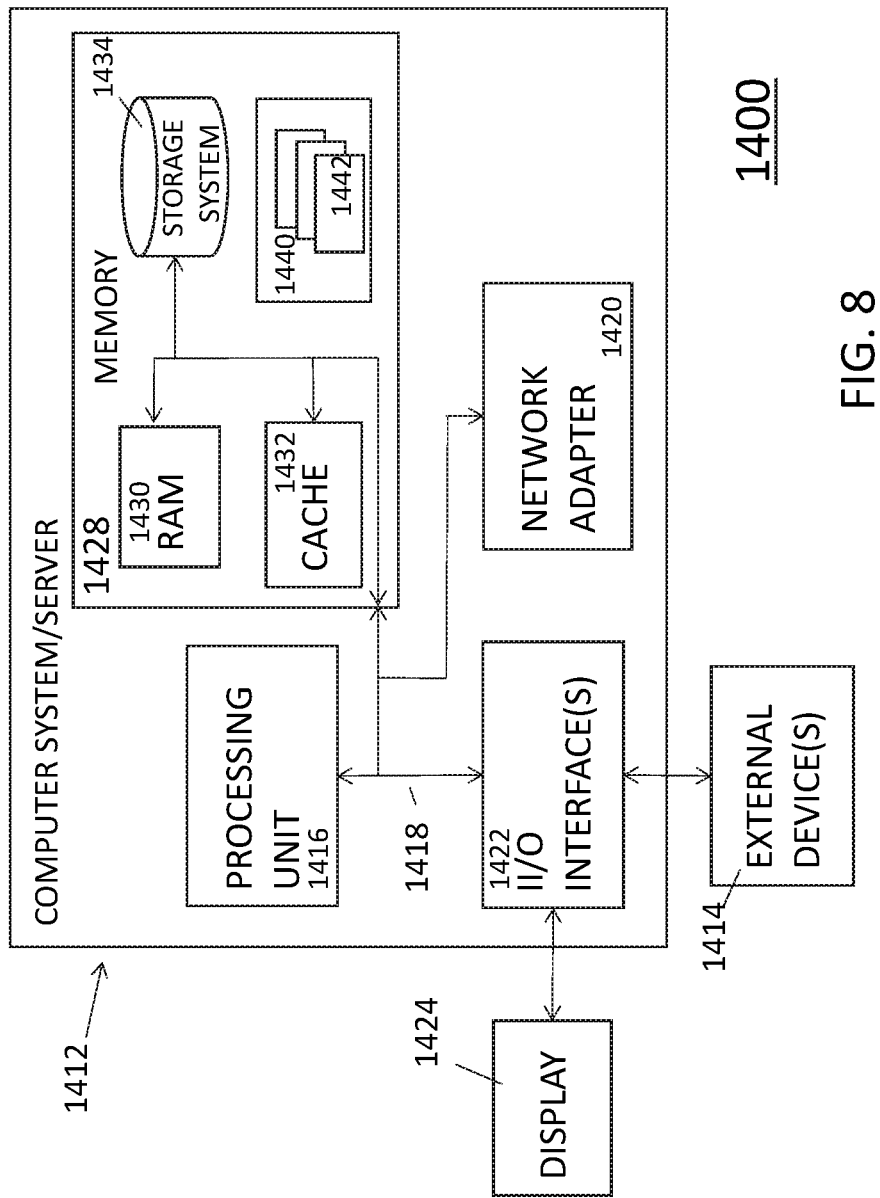
FIG. 8 depicts a cloud computing node according to an example embodiment of the present invention.

Referring now to FIG. 8, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 9:
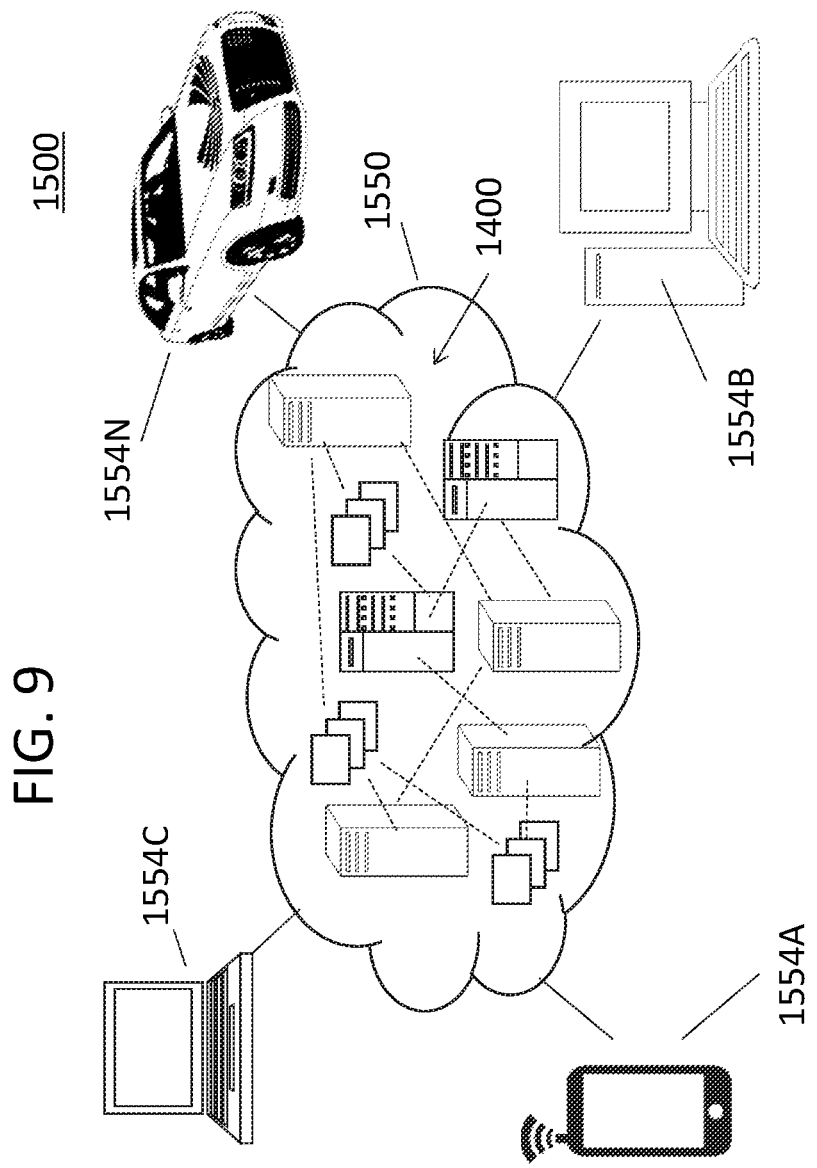
FIG. 9 depicts a cloud computing environment according to an example embodiment of the present invention.

Referring now to FIG. 9, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 9 are intended to be illustrative only and that computing nodes 1400 and cloud computing environment 1550 can communicate with any type of computerized device over any type of network and/or network addressable connection (e.g., using a web browser).

Figure 10:
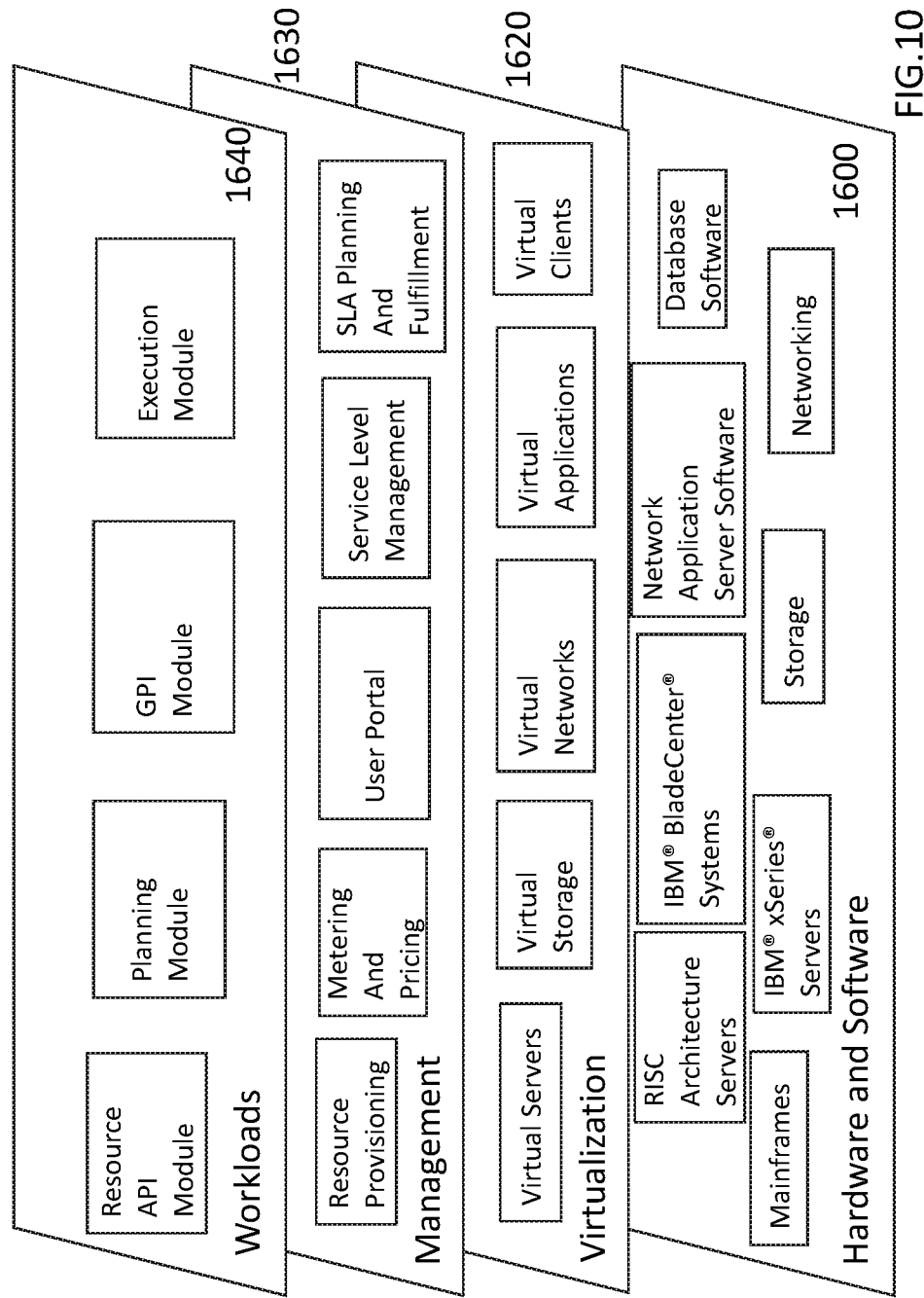
FIG. 10 depicts abstraction model layers according to an example embodiment of the present invention.

Referring now to FIG. 10, a set of functional abstraction layers provided by cloud computing environment 1550 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method of generating distinguishable data, comprising:

processing, by a processor, input data into a plurality of elements;

calculating, by the processor, distinguishability of the plurality of elements using phonetic vowels;

determining, by the processor, distinguishable elements from among the plurality of elements for speech recognition, according to the distinguishability calculation with the phonetic vowels; and providing an output based on the determining by the processor; and controlling a device based on the output, wherein the input data comprises a plurality of words parsed from the input data, and wherein the determining of the distinguishable elements includes determining which words when paired together are phonetically distinguishable using the phonetic vowels to output distinguishable words, wherein the calculating of distinguishability includes calculating using clustering based on vowel saliency, comprising:

generating a phonetic transcription for each word;

calculating a corner vowel partial overlap of the plurality of words;

calculating a strong vowel partial overlap of the plurality of words;

determining the distinguishable words based on the calculations of the corner vowel partial overlap and the strong vowel partial overlap;

using the output from the processor to create a machine control grammar; and controlling a robot via a voice command using the created machine control grammar.

2. The method according to claim 1, wherein the calculating of distinguishability includes calculating using clustering based on vowel saliency,
further comprising calculating a corner vowel partial overlap of a plurality of words, and
wherein the calculating of distinguishability includes calculating using clustering based on vowel saliency.

3. The method according to claim 1, wherein the calculating of distinguishability includes calculating with a phoneme cost matrix, and
wherein the calculating of distinguishability includes calculating using clustering based on vowel saliency,
further comprising:
generating a phonetic transcription for each word;
calculating a first predetermined vowel partial overlap of a plurality of words;
calculating a second predetermined vowel partial overlap of the plurality of words; and
learning based on the output based on the determining by the processor.

4. The method according to claim 1, wherein the input data being multi-modal data from a plurality of sources for tutoring or assessment,
wherein the calculating of distinguishability includes calculating with a phoneme matrix.

5. The method according to claim 1, wherein the calculating of distinguishability includes calculating with a phoneme cost matrix, comprising:
phonetically transcribing each of the words;
editing the transcribed words;
inputting the phoneme cost matrix via a user or a machine; and
calculating a weighted phonetic distance from the phoneme cost matrix for the edited transcribed words.

6. The method according to claim 1 being cloud implemented, and further comprising:
using the output from the processor to create a machine control grammar; and
controlling a robot via a voice command using the created machine control grammar.

7. A system for generating distinguishable data, comprising:
a memory storing computer instructions; and
a processor configured to execute the computer instructions, stored in the memory, to:
process input data into a plurality of elements;
calculate distinguishability of the plurality of elements using phonetic vowels;
determine distinguishable elements from among the plurality of elements for speech recognition, according to the distinguishability calculation; providing an output based on the determining; and
controlling a device based on the output,
wherein the input data comprises a plurality of words parsed from the input data, and
wherein the determining of the distinguishable elements includes determining which words when paired together are phonetically distinguishable using the phonetic vowels to output distinguishable words,
wherein the calculating of distinguishability includes calculating using clustering based on vowel saliency, comprising:
generating a phonetic transcription for each word;
calculating a corner vowel partial overlap of the plurality of words;
calculating a strong vowel partial overlap of the plurality of words;
determining the distinguishable words based on the calculations of the corner vowel partial overlap and the strong vowel partial overlap;
using the output from the processor to create a machine control grammar; and
controlling a robot via a voice command using the created machine control grammar.

8. The system according to claim 7, wherein the calculating of distinguishability includes calculating using clustering based on vowel saliency.

9. The system according to claim 7, wherein the calculating of distinguishability includes calculating with a phoneme cost matrix, and
wherein the calculating of distinguishability includes calculating using clustering based on vowel saliency.

10. The system according to claim 7, wherein the input data being multi-modal data from a plurality of sources for tutoring or assessment, and
further comprising calculating a corner vowel partial overlap of a plurality of words.

11. The system according to claim 7, wherein the calculating of distinguishability includes calculating with a phoneme cost matrix, comprising:
phonetically transcribing each of the words;
inputting the phoneme cost matrix via a user or a machine; and
calculating a weighted phonetic distance from the phoneme cost matrix for the edited transcribed words.

12. A computer program product comprising a computer readable storage medium including program instructions stored therewith, the program instructions readable and executable by a computer to cause the computer to perform a method, comprising:
processing input data into a plurality of elements;
calculating distinguishability of the plurality of elements using phonetic vowels;
determining distinguishable elements from among the plurality of elements according to the distinguishability calculation for speech recognition; providing an output based on the determining by the computer; and
controlling a device based on the output,
wherein the input data comprises a plurality of words parsed from the input data, and
wherein the determining of the distinguishable elements includes determining which words when paired together are phonetically distinguishable using the phonetic vowels to output distinguishable words,
wherein the calculating of distinguishability includes calculating using clustering based on vowel saliency, comprising:
generating a phonetic transcription for each word;
calculating a corner vowel partial overlap of the plurality of words;
calculating a strong vowel partial overlap of the plurality of words;
determining the distinguishable words based on the calculations of the corner vowel partial overlap and the strong vowel partial overlap;
using the output from the processor to create a machine control grammar; and
controlling a robot via a voice command using the created machine control grammar.

13. The computer program product according to claim 12, wherein the calculating of distinguishability includes calculating using clustering based on vowel saliency.

14. The computer program product according to claim 12, wherein the calculating of distinguishability includes calculating with a phoneme cost matrix, and
 further comprising calculating a corner vowel partial overlap of a plurality of words.

\* \* \* \* \*